Figure 7:
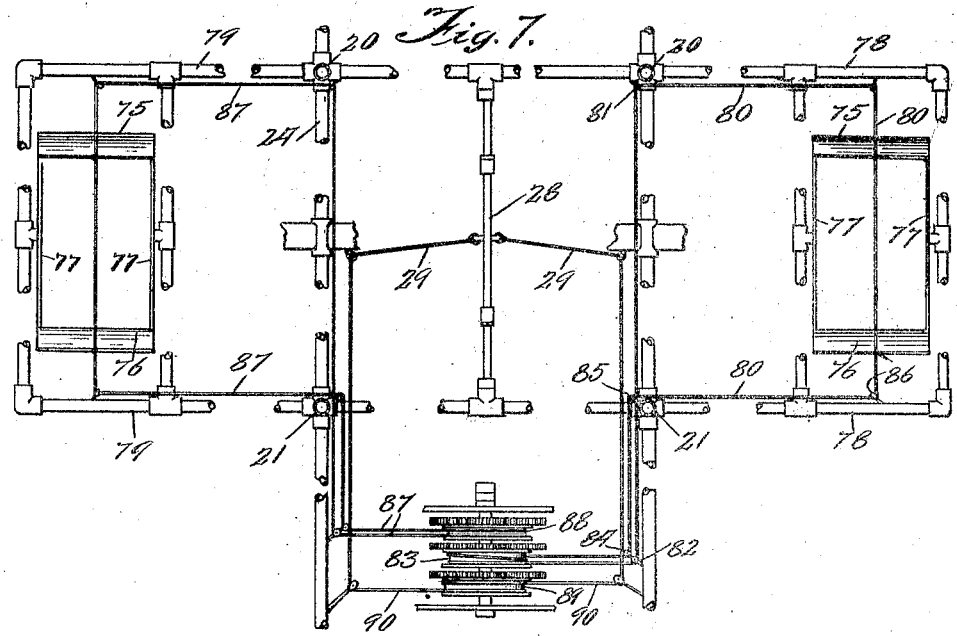

W. B. SHEPARD.
AEROPLANE.
APPLICATION FILED JULY 29, 1910.
1,028,143.
Patented June 4, 1912.
7 SHEETS—SHEET 1.
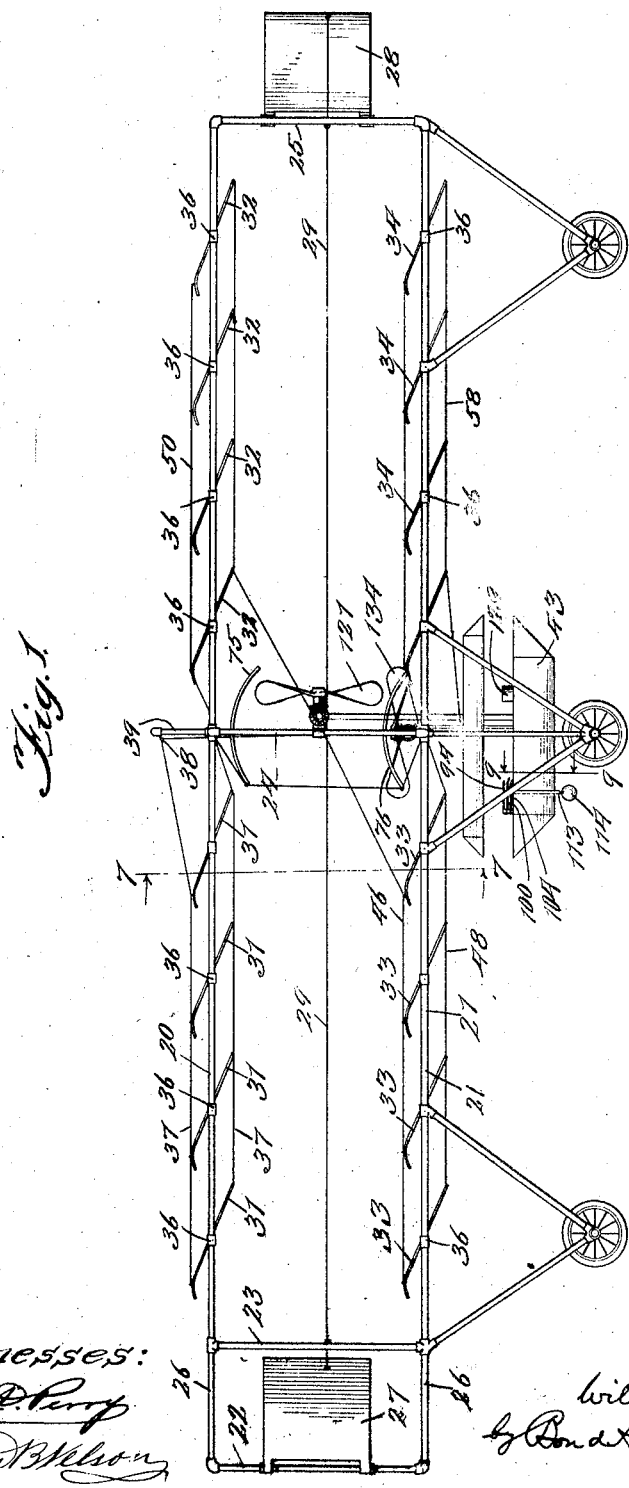

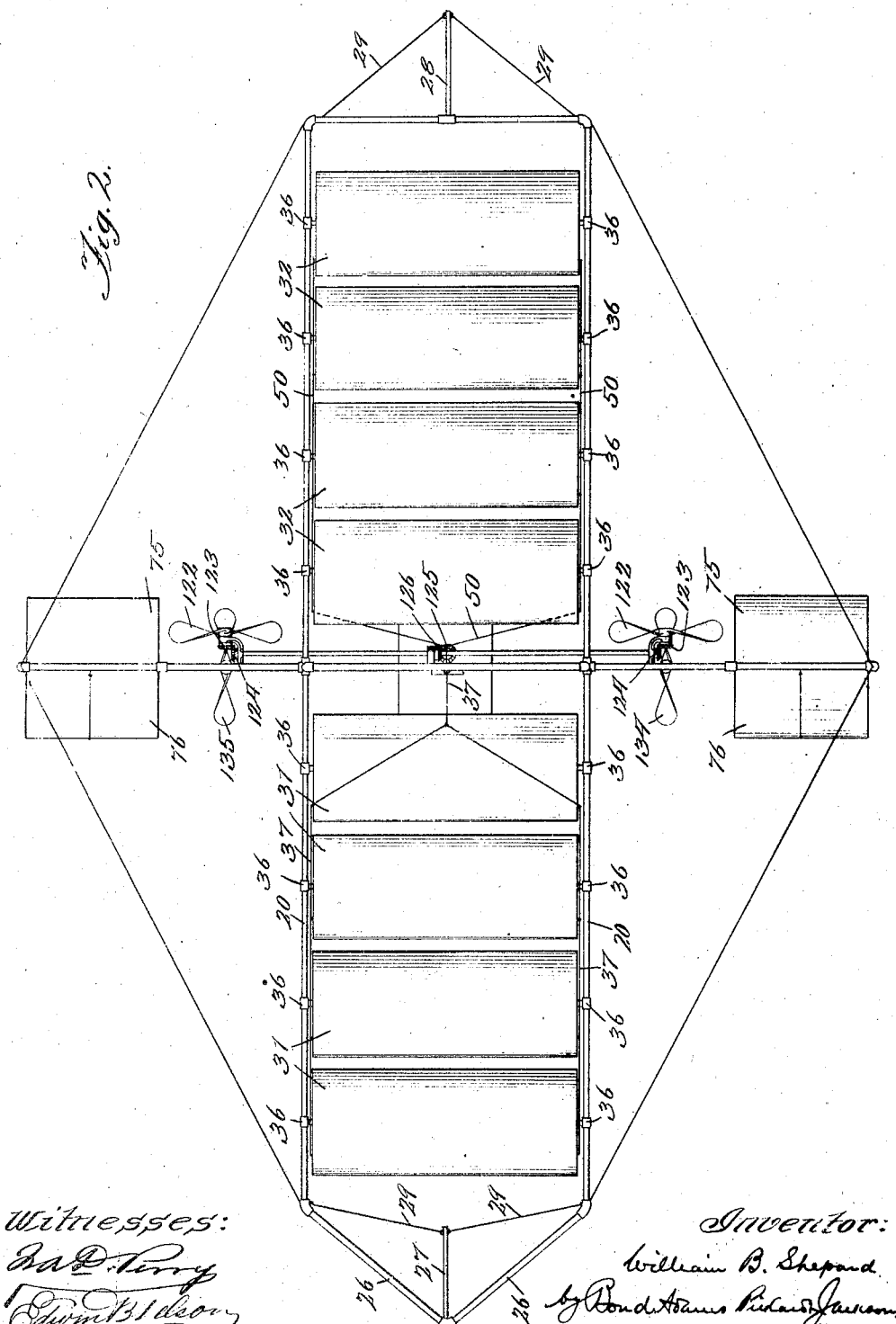

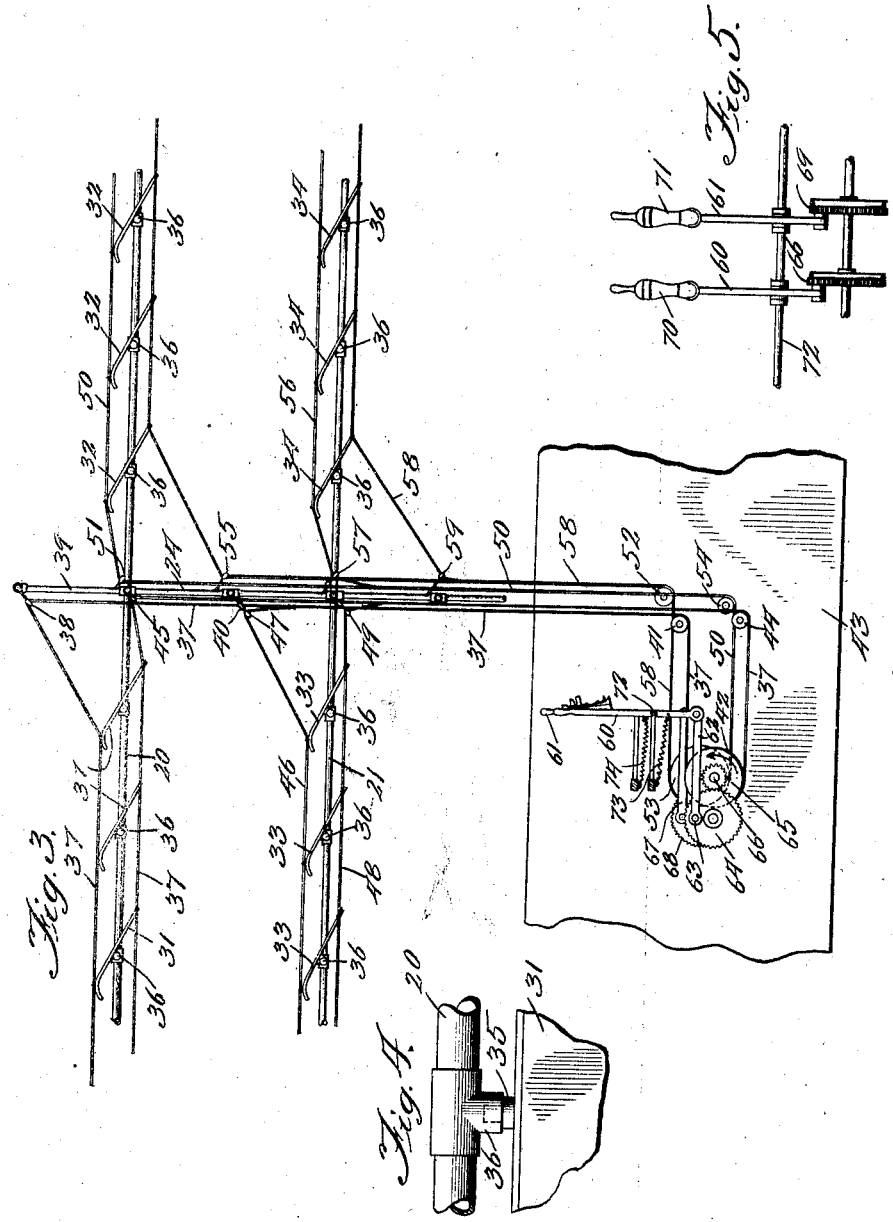

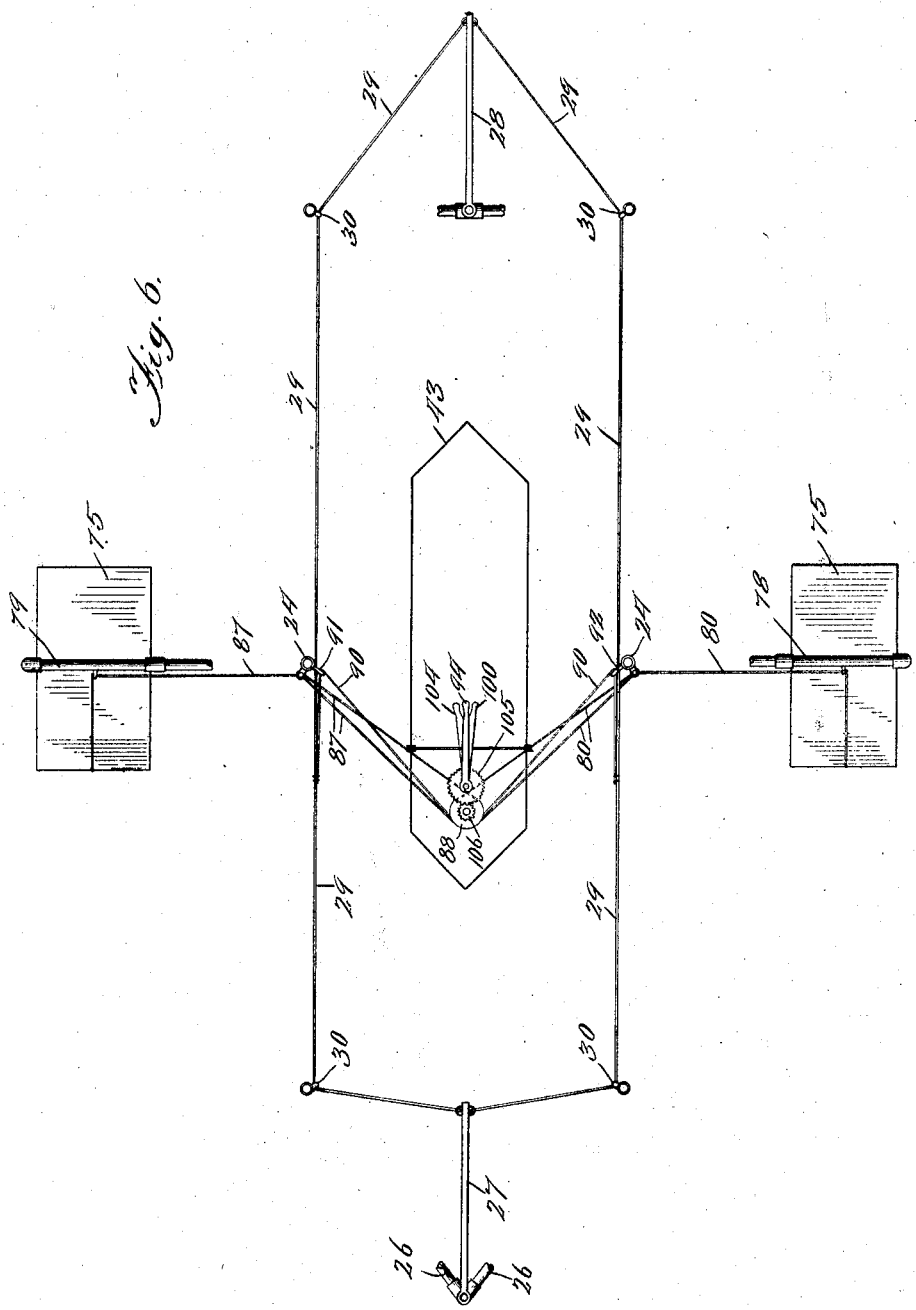

W. B. SHEPARD.
AEROPLANE.
APPLICATION FILED JULY 29, 1910.

1,028,143.

Patented June 4, 1912.

7 SHEETS—SHEET 5.

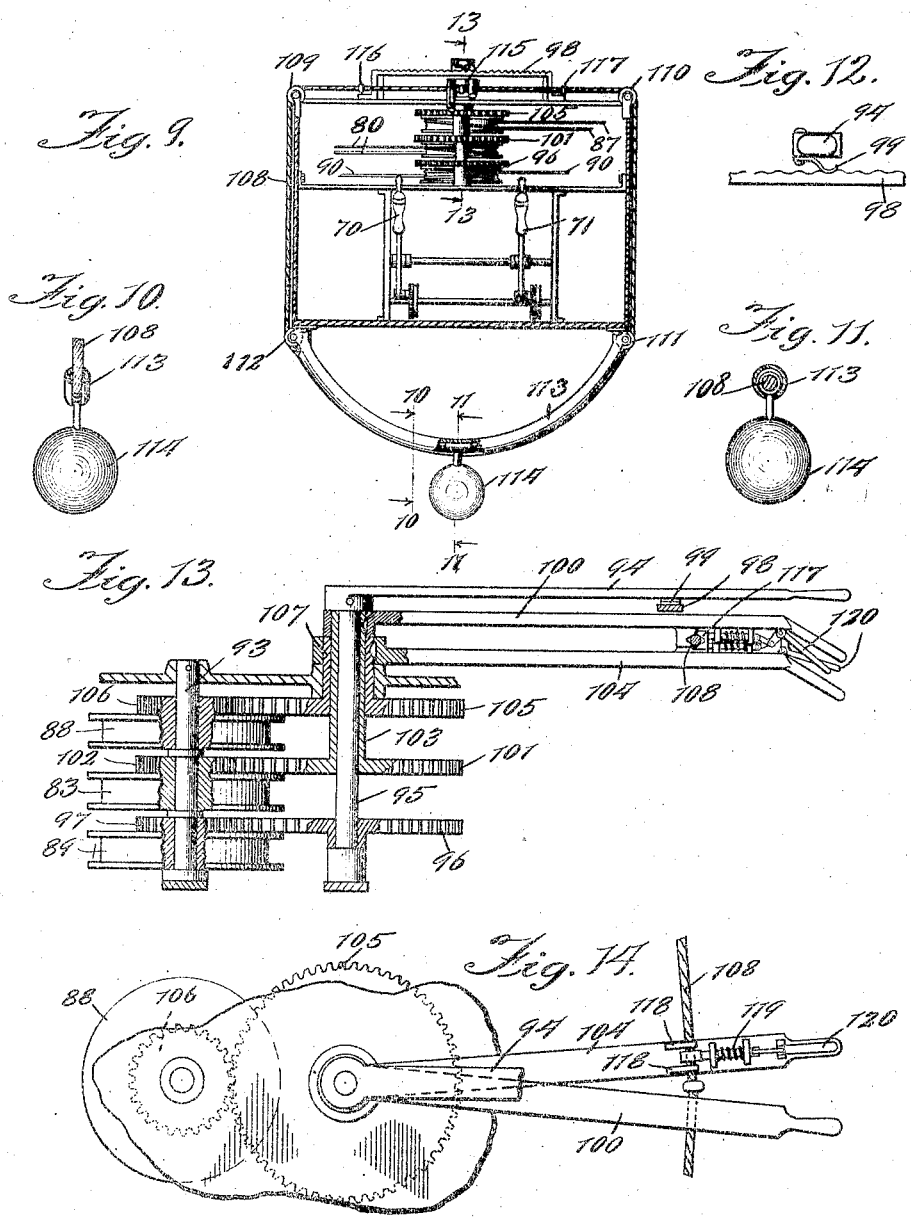

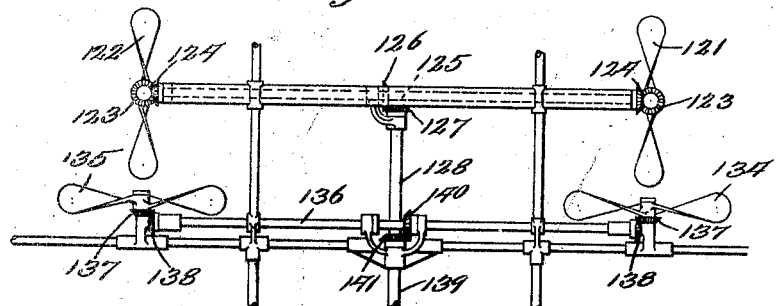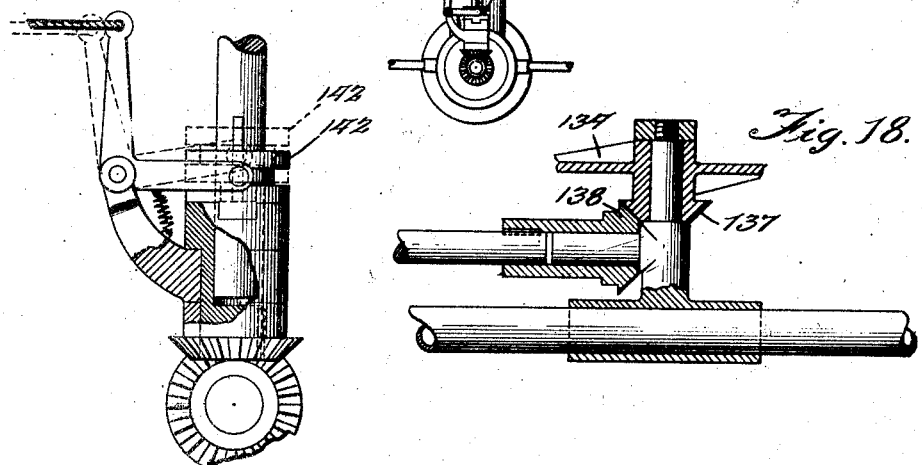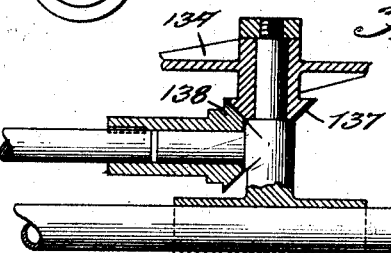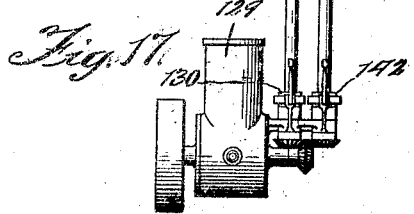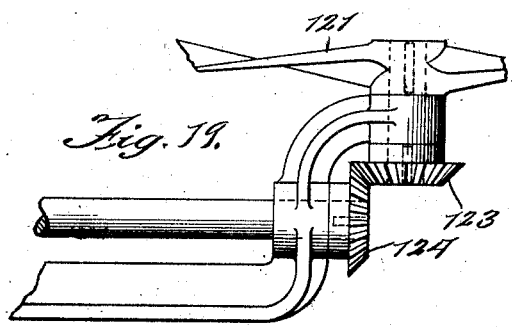

UNITED STATES PATENT OFFICE.

WILLIAM B. SHEPARD, OF BELOIT, WISCONSIN.

AEROPLANE.

1,028,143.   Specification of Letters Patent.   Patented June 4, 1912.

Application filed July 29, 1910. Serial No. 574,499.

*To all whom it may concern:*

Be it known that I, WILLIAM B. SHEPARD, a citizen of the United States, residing at Beloit, in the county of Rock and State of Wisconsin, have invented certain new and useful Improvements in Aeroplanes, of which the following is a specification, reference being had to the accompanying drawings.

My invention relates to aeroplanes, and has for its objects to provide an improved aeroplane having means by which it may be readily steered while traveling in a level plane or directed into higher or lower planes while advancing through the air, or balanced laterally, either while advancing or remaining stationary so far as forward movement is concerned, or may be moved vertically up or down independently of forward movement; also to provide an aeroplane with means for automatically maintaining the lateral balance of the machine.

A further object is to improve the construction and operation of aeroplanes in other respects, as will be hereinafter pointed out.

I accomplish these objects as illustrated in the drawings and as hereinafter pointed out.

What I regard as new is set forth in the claims.

Figure 8:
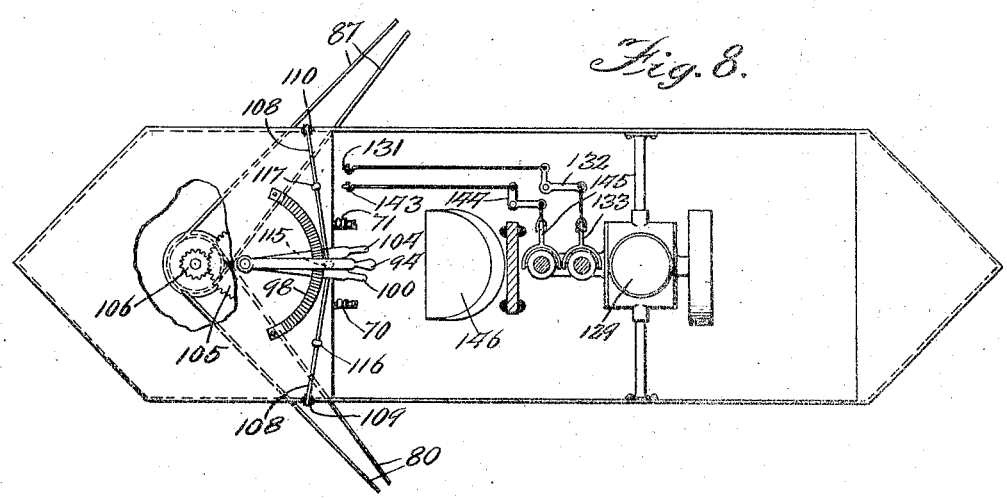

In the accompanying drawings,—Figure 1 is a side elevation of my improved aeroplane; Fig. 2 is a plan view thereof; Fig. 3 is a partial side view, a part of the controlling mechanism being shown somewhat diagrammatically; Fig. 4 is an enlarged detail illustrating one of the pivots of the main sustaining planes; Fig. 5 is a detail showing the operating levers and connections by which the angles of the main planes are varied; Fig. 6 is a partial plan view illustrating the arrangement of the lateral balancing planes and the mechanism for controlling their position; Fig. 7 is a partial sectional view, taken substantially on line 7—7 of Fig. 1, further illustrating the mechanism for controlling the position of the lateral balancing planes; Fig. 8 is a partial plan view showing the car and operating mechanism carried thereby; Fig. 9 is an enlarged detail, being a partial vertical section on line 9—9 of Fig. 1, illustrating the mechanism for automatically maintaining the lateral balance of the machine; Fig. 10 is a detail, being a vertical section on line 10—10 of Fig. 9; Fig. 11 is a vertical section on line 11—11 of Fig. 9; Fig. 12 is a detail showing the steering lever in end view and the spring detent for holding it in position; Fig. 13 is an enlarged detail, being a vertical section on line 13—13 of Fig. 9; Fig. 14 is a plan view of the parts shown in Fig. 13; Fig. 15 is a detail showing the arrangement of the propellers and their connections with the motor; Fig. 16 is an enlarged view of certain of the parts shown in Fig. 15, illustrating the arrangement of the clutches by which the propellers are connected with the motor; Fig. 17 is a view taken at right angles to that shown in Fig. 16; Fig. 18 is a sectional view showing the support for one of the horizontal propellers and the driving connections thereof; and Fig. 19 is a partial plan view showing the connection of one of the vertical propellers.

My improved aeroplane comprises, in general, a fore-and-aft extending frame which carries one or more series of main sustaining planes, the planes of each series being mounted in said frame upon transverse axes arranged in the same horizontal plane and being arranged to rock about such transverse axes so as either to lie substantially in the same plane or to be turned at the same angle to the vertical. Preferably I employ two of such series of main sustaining planes arranged one above the other. The same number of planes is provided at each side of the longitudinal center of the frame and the axis of each of the several planes is arranged centrally thereof so that each plane is balanced after the manner of a butterfly valve, and consequently may be readily rocked upon its axis. In addition to these main sustaining planes I provide laterally-disposed balancing planes at each side of the main frame, said balancing planes being pivotally mounted so that they are adapted to rock about a transverse axis so as to change their fore-and-aft inclination. Rudders are provided at the front and rear ends of the frame for steering purposes, said rudders being arranged to operate in unison in such manner that they coöperate in steering the machine. A pair of vertical propellers are provided mounted on axes parallel with the longitudinal axis of the machine for advancing it, and a pair of horizontal propellers arranged to rotate about vertical axes are provided for moving the machine upward. The several planes may be rocked by the operator to change their angular position from a car mounted under the main frame of the machine, said car being provided with suitable levers and connections by which the several operations may be effected. The car also carries the motor by which the propellers are rotated.

Referring now to the drawings,—20—21 indicate upper and lower members of the main frame, each of which is rectangular in form, as shown in Fig. 2,—said members being connected together by upright rods 22—23—24—25, as shown in Fig. 1, forming an open frame which is, in general, cubical in form except that at its forward end it is wedge shaped, as shown at 26 in Fig. 2, to form what may be termed the bow of the machine.

27 indicates a front rudder which is pivoted upon the rod 22 so as to swing about said rod as an axis and extends rearwardly therefrom. 28 indicates a rear rudder which is similarly pivoted upon the rod 25 and extends rearwardly therefrom. The rear edges of the rudders 27—28 are connected together by a wire cable 29 which extends around the frame of the machine, running through suitable eyes or guides 30 secured to the several rods 23—25, as best shown in Fig. 6. Obviously, by this construction movement of the cable 29 in either direction will operate to move the two rudders oppositely to each other so that they will coöperate to steer the machine to one side or the other. By turning them to a sharp angle the machine may be caused to turn in a circle of very short radius. The mechanism for moving the cable 29 to change the angular position of the rudders will be hereinafter described.

31 indicates the front planes of the upper series of main planes, and 32 the rear planes of the upper series, and 33—34, respectively, the corresponding planes of the lower series. Each of these main planes is pivotally mounted on a transverse axis arranged at its longitudinal center and journaled in the side members of the frame of the machine, preferably as shown in Fig. 4. Each plane, as 31, is provided with laterally-projecting trunnions 35 which fit in suitable bearings 36 provided on the side member 20 or 21 of the main frame, thus permitting the plane to rock about its transverse axis. Each series of main planes is composed of an equal number of front and rear planes which are preferably of the proportions shown in Fig. 2, being considerably shorter fore-and-aft than they are transversely of the frame, and their forward edges are curved, as shown in Fig. 1. The planes of each series are set so that when they are swung down so as to lie parallel with the main frame they are spaced a short distance apart, as shown in Fig. 2. The front planes of the upper series are connected together near their forward margins by a cable 37 which runs through an eye 38 carried by an upward extension 39 of the rod 24. Said cable thence passes downward through an eye 40 carried by the rod 24 to a pulley 41 around which it passes to a drum 42 arranged in the car 43,—said car being supported below the main frame as shown in Fig. 1. After passing around the drum 42, the cable 37 passes up around a pulley 44 and thence upward and through an eye 45 to the rear margins of the front planes 31, with which it is connected, as shown in Fig. 3. It will thus be seen that by moving the cable 34 backward or forward power is applied to the front and rear margins of the front planes 31, thereby changing their angular position. In order to adjust the lower front planes 33 in unison with and similarly to the upper front planes 31, their forward margins are connected with the cable 37 by a cable 46 which runs through an eye 47 and is then connected with the cable 37, and their rear margins are similarly connected by a cable 48 with the cable 37, the cable 48 passing through an eye 49, as shown in Fig. 3. In like manner, the upper and lower rear planes of both series or tiers are synchronously and similarly adjusted, 50 indicating a cable which is connected to the forward portions of the upper planes 32, thence passing through an eye 51, thence downward around a pulley 52 to a drum 53, around which it passes, thence proceeding back around a pulley 54, and thence up through an eye 55 to the rear margins of the rear planes of the upper tier, to which it is connected as shown in Fig. 3.

56 indicates a cable which is connected with the forward portions of the rear planes of the lower series, and thence connects with the cable 50, after passing through an eye 57, and 58 indicates a cable connected with the rear portions of the lower rear planes 34 and connected with the cable 50 after passing through an eye 59. The rear planes of both series will always, therefore, bear the same angular relation to each other and be correspondingly and equally adjusted.

The cables 37 and 50 are moved longitudinally to vary the angular position of the planes with which they are respectively connected by rotating the drums 42—53, and for this purpose I provide levers 60—61, the lever 60 being connected with the drum 42 and the lever 61 with the drum 53. Preferably I connect said levers with their respective drums by the devices shown in Figs. 3 and 5, although any other suitable construction may be employed. In the arrangement shown the lever 60 is provided with a connecting rod 62 which is connected by a wrist-pin 63 with a gear 64 which meshes with a pinion 65 mounted on the shaft 66 which carries the drum 42. By this construction by moving the lever 60 forward the gear 64 will be partly rotated, thereby rotating the drum 42 and shifting the cable 37 which is wound upon it. In like manner the lever 61 is connected with its drum by a connecting rod 67, gear 68, and pinion 69, as shown in Fig. 5. By properly proportioning the several gears, any desired relative movement of the levers 60—61 and the planes controlled by them may be secured. In the arrangement shown the levers 60—61 are provided with foot-rests 70—71, respectively, so that the operator may move said levers back and forth by means of his feet.

In Fig. 3 I have shown the arrangement of the levers 60—61, the drums 42—53 and their connections somewhat diagrammatically in order to more clearly illustrate the fact that there are two of such levers and connections, but it will be understood that in practice the axes of the drums will be concentric and the several parts will be side by side instead of as shown in Fig. 3. The correct position of the parts is shown in Fig. 5, in which both of said levers are shown as being fulcrumed upon a transverse shaft 72. 73—74 indicate springs for returning the levers 60—61 to their upright position when released from pressure, the normal position of said levers being upright as illustrated.

When the operator desires to increase the angular relation of the front main planes to the horizontal, he will press forward the lever 60, thereby rotating the drum 42 in the direction indicated by the arrow in Fig. 3 and consequently pulling back on that portion of the cables 37 and 46 which is connected with the forward edges of the front planes, thus rocking the planes upon their axes so as to carry their forward edges farther to the rear and make them assume a position more nearly vertical. Movement of said lever in the opposite direction secures the opposite result. In like manner the rear planes may be adjusted by operating the lever 61. When either lever is released by the operator, it will be returned to its normal position by its spring 73 or 74, as the case may be. Thus the operator may regulate the flight of the aeroplane while it is moving forward so as to cause it either to ascend, descend or maintain itself in a horizontal plane.

For the purpose of maintaining or restoring the lateral balance of the machine, it is provided with two pairs of balancing planes, each composed of upper and lower planes 75—76, respectively, connected together by side bars 77 pivoted centrally upon transverse axes so that they may swing fore-and-aft to change their inclination to the longitudinal axis of the machine. Said balancing planes are mounted at the longitudinal center of the main frame, as shown in Fig. 1, being supported in lateral extensions 78—79 of the main frame, as shown in Fig. 7. The position of each of the balancing planes may be adjusted independently of the other so that if desired one of said planes may be employed to secure a lifting effect, or furnish a lateral support at one side of the machine, while the other plane is turned so that it gives less lifting effect, or forms a less effective support for the other side of the machine, or does not support it at all. For example, when the machine is traveling forward, if it tilts so that one side is lower than the other, the balancing plane at the lower side would be turned to a more nearly horizontal position, while the balancing plane at the higher side would be turned so as to be inclined downward from rear to front. Thus the low side would be given more, and the high side less, support, and consequently the forward movement of the machine would operate to restore it to its horizontal position.

The balancing planes are adjusted by the means shown in Fig. 7, from which it will be seen that the right-hand balancing planes are connected by a cable 80 attached to their forward edges, said cable extending through a guide 81, thence down around a guide 82 to a drum 83, thence back around guides 84—85—86. Obviously, by rotating the drum 83 the cable 80 may be moved to swing the planes 75—76 at the right-hand side of the machine to any desired angle. In like manner the other pair of balancing planes is connected by a cable 87 with a drum 88 so that by rotating the latter drum the cable 87 may be adjusted to change the position of the left-hand balancing planes. 89 indicates a third drum which is connected by a cable 90 with the cable 29 by which the front and rear rudders are operated, as best shown in Figs. 6 and 7. As shown in Fig. 6, the cable 90 passes around guides 91—92 and is connected at its ends with the cable 29, its intermediate portion passing around the drum 89, as shown in Fig. 7.

The three drums 83, 88 and 89 are mounted concentrically in a horizontal position in the car 43 upon a common vertical axis 93, as shown in Fig. 13, and separate levers are provided for rotating them as will now be described.

94 indicates a steering lever, which is secured to and projects horizontally from a vertical shaft 95 mounted adjacent to and parallel with the axis of the drums 83, 88 and 89, as best shown in Fig. 13. The steering lever 94 is keyed to the shaft 95, which is geared to the drum 89 by a gear 96 mounted upon and keyed to said shaft, and a pinion 97 secured to the drum 89 concentrically therewith, as shown. Thus by swinging the steering lever 94 to one side or the other the drum 89 may be rotated in either direction. 98 indicates a segmental rack mounted in a convenient position to be engaged by a spring-dog 99 carried by the lever 94, as best shown in Figs. 8, 9 and 12, thus holding the steering-lever in its different positions of adjustment. 100 indicates a lever for rotating the drum 83, said lever being operatively connected with said drum by means of a gear 101 which is loosely mounted on the shaft 95 and meshes with a pinion 102 which is secured to the drum 83 concentrically therewith, as shown in Fig. 13. The gear 101 is provided with a sleeve 103 which extends up to near the upper end of the shaft 95, the lever 100 being mounted upon and keyed to said sleeve as shown. Thus the lever 100 may be operated independently of the shaft 95 to rotate the drum 83 in either direction. 104 indicates a lever for rotating the drum 88, said lever being connected with its drum by means of a gear 105 which meshes with a pinion 106 connected concentrically with the drum 88. The gear 105 also is provided with a sleeve 107 which fits loosely upon the sleeve 103 and carries the lever 104, which is keyed to it, as shown in Fig. 13. Thus the lever 104 may be operated independently of the other levers 100 and 94. By this construction the levers and also the balancing planes at either side of the machine may be operated independently of each other as the operator may desire.

For the purpose of automatically maintaining or restoring the lateral balance of the machine, when it is moving forward, I employ the following mechanism: 108 indicates an endless cable, which runs around pulleys 109—110—111—112 and through a curved guide 113 in the form of a slotted tube secured to the car 43, as shown in Figs. 1 and 9. The cable 108 is so disposed as to extend across the car between the outer ends of the levers 100 and 104, as shown in Fig. 13, and carries a balancing weight 114 at its lower side, as shown in Figs. 9, 10 and 11, said weight being secured fixedly to the cable so that movement of the weight along the guide 114 will act to move the cable. Obviously, gravity will operate to hold the weight 113 at the lowest point, and consequently rocking of the machine to one side or the other will operate to shift the cable 108 in one direction or the other. The cable 108 is provided on its upper side with three buttons 115—116—117, as best shown in Fig. 9, the button 115 being directly opposite the weight 114, and the buttons 116—117 equally distant from the center button at opposite sides thereof, as shown. Normally i. e. when the machine is laterally balanced the weight 114 stands at the center of the guide 113, and the center button 115 stands centrally between the pulleys 109—110 which are at the sides of the car. Each of the levers 100 and 104 is provided with gripping mechanism for gripping the cable 108, as shown in Figs. 13 and 14, said mechanism preferably comprising a V-shaped clamping block 117 which engages the cable and presses it against stops 118 carried by the lever—said clamping block being normally held against the cable by a spring 119. A lever 120 is provided for releasing the clamp. Any other suitable clamping mechanism may, however, be employed. It will be obvious that when the levers 100 and 104 are in locking engagement with the cable 118 movement of the cable in either direction will operate said levers and consequently adjust the angular position of the balancing planes. The arrangement is such that when the levers 100—104 occupy their central position their respective balancing planes will be horizontal, and movement of the lever 100 to the right, and of the lever 104 to the left will rock the balancing planes to turn their front edges down below the horizontal; consequently movement of both levers 100—104 in the same direction will swing their respective balancing planes in opposite directions. When both levers are set at the center button, the balancing planes at both sides will be horizontal, and when the machine is progressing if it rocks laterally the movement of the cable 108 under the action of the balancing weight 114 will operate to move the levers 100—104 so as to turn the front edge of the balancing plane on the higher side down below the horizontal, and the front edge of the balancing plane on the other side up above the horizontal, thus securing a lifting action by the planes on the depressed side and depressing effect by the planes on the elevated side, thereby tending to restore the equilibrium of the machine. It will be apparent, therefore, that the balancing weight 114, acting through the cable 108 and levers 100—104, will operate to automatically maintain or restore the lateral balance of the machine.

The buttons 116—117 are employed to indicate the points at which the levers 100—104 should clamp the cable 108 to set the balancing planes at the proper angle for automatically balancing the machine when it is stationary, as will be hereinafter described.

The machine is propelled in a forward direction by means of vertical propellers 121—122 driven by gears 123—124 from a transverse shaft 125 which in turn is driven through gears 126—127 by a vertical shaft 128, as best shown in Fig. 15. The latter shaft is connected with a motor 129 by a clutch 130, said clutch being operated by a lever 131, as shown in Fig. 8, through any suitable intermediate mechanism such as bell-crank levers 132—133. The machine is moved vertically by horizontal propellers 134—135 driven from a shaft 136 through gears 137—138, said shaft being in turn driven from a shaft 139 through gears 140—141, as shown in Fig. 15. The shaft 139 is also connected with the motor 129 by a clutch 142, as shown in Fig. 17, said clutch being operated by a lever 143, as shown in Fig. 8, through suitable intermediate mechanism such as bell-crank levers 144—145. As shown in Fig. 8, 146 indicates the driver's seat. By this construction the operator may readily control the operation of either the horizontal or vertical propellers so that they may be driven separately or simultaneously as desired.

From the foregoing description, it will be seen that my improved machine comprises generally the main sustaining planes which extend longitudinally of the machine, the propelling mechanism for driving the machine forward, and lateral wings or balancing members composed of the horizontal propellers and the balancing planes, the latter being in effect the wing tips by which the lateral balance of the machine is maintained or restored.

In operating the machine the main planes are set at the desired angle to carry the machine horizontally or on a level plane, or upward or downward, as desired, the angle of such planes being entirely under the control of the operator, who may adjust them at his pleasure by operating the foot-levers 60—61. By operating both foot-levers together the front and rear main planes may be simultaneously and similarly adjusted, or by operating said levers independently the front and rear main planes may be set at different angles. In the absence of pressure on said levers the springs connected with them operate to hold the main planes in their normal position. If, when the machine is traveling forward, the forward part of the machine should start to drop, it could be caused to ascend a little by moving forward the foot-lever controlling the position of the front main planes, or the rear portion of the machine could be permitted to drop by moving the proper foot-lever to the rear, thereby decreasing the angle of the rear main planes with reference to the frame. In like manner, by properly operating the foot-levers the operator could direct the machine upward, if desired.

Normally, when the machine is advancing the balancing levers are held stationary in their central position by their engagement with the cable 108 as long as the machine is properly balanced, but if it should rock to one side or the other, under the action of the balancing weight such levers would be moved in the proper direction to restore the balance of the machine in the manner already described. For automatically balancing the machine laterally, when it is not moving forward, the levers 100—104 are set at the points indicated by the buttons 116—117, thereby setting the balancing planes at both sides of the machine so that they are inclined downward from rear to front at an angle of about 45°. Bearing in mind the fact that movement of the balancing levers in the same direction rocks their respective planes in opposite directions, it will be apparent that, with the levers in this position, when the car tips laterally, the balancing levers will be operated automatically by the balancing weight to move the balancing plane on the low side to a more nearly horizontal position, and the one on the high side to a more nearly vertical position, thus permitting the high side to drop, while the lower side will receive the full sustaining effect of its balancing planes. In this way the equilibrium of the machine will automatically be restored.

By closing all the planes of the machine to a position where they have the greatest supporting effect and stopping the vertical propellers and driving the horizontal propellers at such speed that they barely overcome the power of gravity, the machine may be caused to remain stationary in the air. By moving the planes to the desired angle and driving all four propellers the machine may be caused to ascend on a greater and more rapid slant than if only the two vertical propellers are driven.

That which I claim as my invention, and desire to secure by Letters Patent, is,—

1. An aeroplane, comprising a frame, one or more sustaining planes, balancing planes at opposite sides of said frame, said balancing planes being adapted to rock about transverse axes, levers operatable independently of each other and connected with said balancing planes, respectively, for independently operating the same, an endless cable, and means for connecting said levers with said cable whereby they may be operated in unison by moving the cable.

2. An aeroplane, comprising a frame, one or more sustaining planes, balancing planes at opposite sides of said frame, said balancing planes being adapted to rock about transverse axes, levers operatable independently of each other and connected with said balancing planes, respectively, for independently operating the same, an endless cable, means for connecting said levers with cable whereby they may be operated in unison by moving the cable, and a weight connected with said cable for automatically moving the same in one direction or the other as the machine tilts.

3. An aeroplane, comprising a frame, one or more sustaining planes, balancing planes at opposite sides of said frame, said balancing planes being adapted to rock about transverse axes, drums carried by said frame, cables operating on said drums and connected, respectively, with said balancing planes, levers connected, respectively, with said drums for rotating the same, said levers being operatable independently of each other, an endless cable, and means for connecting said levers with said endless cable whereby they may be operated in unison by moving the cable.

WILLIAM B. SHEPARD.

Witnesses:
 EDWIN M. BAILEY,
 WM. N. SHEPARD.